United States Patent [19]

Rohner

[11] 4,031,520

[45] June 21, 1977

[54] MULTISTAGE SORTER HAVING PUSHDOWN STACKS WITH CONCURRENT ACCESS TO INTERSTAGE BUFFER MEMORIES FOR ARRANGING AN INPUT LIST INTO NUMERICAL ORDER

[75] Inventor: Michel Alexandre Rohner, San Jose, Calif.

[73] Assignee: The Singer Company, Binghamton, N.Y.

[22] Filed: Dec. 22, 1975

[21] Appl. No.: 642,849

[52] U.S. Cl. .............................................. 364/200
[51] Int. Cl.$^2$ .............................................. G06F 7/24
[58] Field of Search .................. 340/172.5; 444/1; 445/1

[56] References Cited

UNITED STATES PATENTS

| | | | |
|---|---|---|---|
| 2,984,822 | 5/1961 | Armstrong et al. | 340/172.5 X |
| 3,013,249 | 12/1961 | Armstrong | 340/172.5 |
| 3,015,089 | 12/1961 | Armstrong | 340/172.5 |
| 3,273,127 | 9/1966 | Armstrong | 340/172.5 |
| 3,388,383 | 6/1968 | Shivdasani et al. | 340/172.5 |
| 3,399,383 | 8/1968 | Armstrong | 340/172.5 |
| 3,740,538 | 6/1973 | Hemphill | 340/172.5 X |

*Primary Examiner*—Melvin B. Chapnick
*Attorney, Agent, or Firm*—Paul Hentzel; James C. Kesterson

[57] ABSTRACT

An input list of N numbers is clocked through a first sort stage having S1 locations entered into an interstage memory as S2 groups of S1 numbers each. The S1 numbers in each group are in numerical order. The first number in each group forms an initial group of S2 numbers which necessarily includes the smallest number of the N input numbers. This initial group is loaded into a second sort stack having S2 locations which arranges the initial S2 numbers in numerical order. The smallest number forms the first number in the output list. A replacement number from the interstage memory is numerically sorted into the second stack each time the smallest remaining number is clocked out. This replacement number is the next number from the same group as the most recently clocked out number. Each new smallest remaining number must either be the second number in the second stack or the replacement number. In one embodiment two candidates exist for the next replacement number: (1) the next number from the same group as the current replacement number and (2) the next number from the same group as the second number. These candidates are addressed in advance of the current output determination to minimize the clock period. Alternatively, preaddressing may be accomplished by having an initial group of 256 numbers — the two smallest numbers in each of the S2 groups. There is only one candidate for the next replacement number, which candidate may be identified in advance.

15 Claims, 15 Drawing Figures

Fig_1

Fig. 2

Fig_3A    SORT    FLAGS    Fig_3B            Fig_3C
          STACK

Fig_3D            Fig_3E            Fig_3F

UNLOAD  EMPTY
FLAGS   LOCATIONS        Fig_4
        FLAGS

MULTISTAGE SORTER HAVING PUSHDOWN STACKS WITH CONCURRENT ACCESS TO INTERSTAGE BUFFER MEMORIES FOR ARRANGING AN INPUT LIST INTO NUMERICAL ORDER

BACKGROUND OF THE INVENTION

1. Field of the Invention

This invention relates to multipass numerical sorting and more particularly to sorting where the input list is divided into sorted groups which are identically stored within concurrently accessed twin interstage buffers.

2. Description of the Prior Art

Heretofore, numerical sorting was done primarily by relatively slow software programs. The limited sorting hardware that was available is based on a cumbersome comparison technique which sometimes required more comparator elements than words in the input list. In some instances the circuitry required increased geometrically as the number N of elements in the input list expanded. Further, these prior art hardware and software sorters are not fast enough for CRT display applications. U.S. patent application Ser. No. 622,911 teaches multipass hardware sorting with minimum circuit requirements. FIGS. 1-7 of this specification, and the detailed description associated therewith, were taken from the above U.S. patent application. In Ser. No. 622,911 the input numbers were arranged into S2 groups of S1 numbers each. The numbers within each S2 groups were arranged in numerical order by a first sorting stack having S1 locations. The smallest number in each group was then entered into a second sorting stack having S2 locations and arranged into numerical order. As the first number in the second stack (the smallest number in the input list) was clocked out, a replacement number was accessed from one of the groups and clocked into the second stack and numerically sorted. The replacement number in Ser. No. 622,911 was always the next number from the same group as the number just clocked out. In the present invention this access time is eliminated by accessing two candidates for the next replacement number simultaneously as the currently clocked out number is replaced by the current replacement number. When the next replacement number becomes the current replacement number, no accessing is required; the two candidates are merely compared and the smallest one is clocked into the second stage as the current replacement number. Accessing next replacement numbers in advance shortens the clock period for clocking out the smallest remaining number in the second stack.

SUMMARY OF THE INVENTION

It is therefore an object of this invention to provide:
a hardware numerical sorter which is faster;
a multipass hardware numerical sorter in which candidates for the sorting are identified from storage in advance;
a multipass hardware sorter in which candidates for the sorting are concurrently accessed from storage prior to the time of sorting; and
a multipass hardware sorter in which replacement number candidates are retrieved from list storage prior to replacement number determination.

Briefly, the present M pass sorting device accomplishes these and other objects by dividing the input list into Q1 groups of items which are individually sorted into numerical order and then progressively merged and resorted into Q2, Q3–QM-1 and QM groups to provide a single output list. A plurality of storage devices is provided between each pass for redundantly storing the partially merged input list. The plurality of storage devices is concurrently accessed to simultaneously provide all of the candidates for a position. The actual selection and transfer of the selected candidate occurs in a subsequent step. In this manner the storage access time of subsequent candidates occurs during the sort time of the present selection, permitting a shorter clock period.

BRIEF DESCRIPTION OF THE DRAWING

Further objects and advantages of the multipass sorter and the operation of the numerical sort stack will become apparent from the following detailed description taken in conjunction with the drawings in which:

FIG. 3A-F shows the operation of the UNLOAD FLAG which appears after each group has been sorted and causes the stacks to begin unloading;

DESCRIPTION OF THE PREFERRED EMBODIMENTS

The Sorting Problem

A given input list has N unordered items or elements. Each element has a key (K) and a non-key (NK) part. The objective of the sorting is to obtain an output list in which the elements appear in ascending (or descending) order of the keys. For example, a list of 100 vertices, each represented by its X,Y,Z coordinates, are to be sorted in order of their Y coordinates. The element of the list are the vertices, the key part is the Y coordinate, and the non-key part is comprised of the X and Z coordinates.

In the multipass sorting method, the ordering is accomplished in two basic steps. First, the input list is divided into groups and sorted into ascending runs. A run is a sorted segment of the list. The relationship of the keys of the i-th run is:

$$K_{i1} \leq K_{i2} \ldots K_{ij} \leq \ldots \leq K_{ip}$$

If there are P keys in each run of a list of N elements, there will be Q = N/P runs. This first step required a single hardware stage. At this point in the sorting process, the numerical relationship of the keys from different runs to each other is unknown.

In the second step of sorting, the Q runs from the first step are merged into a single sorted list. This second step requires one or more hardware stages. The "replacement selection" technique of merging is employed, which operates as follows:

The first (smallest) key of each run or group ($K_{11}$, $K_{21}$, $K_{31}$ ... $K_{Q1}$) are compared to each other, the smallest of this series is the first key in the second pass output — for instance, the first key from the third run, $K_{31}$. The next smallest key must be either the smallest of all the other runs or the second smallest key of the third run, $K_{32}$. As $K_{31}$ advances to the second stage output, $K_{32}$ is compared to the remainder of the series ($K_{11}$, $K_{21}$, $K_{41}$, ... $K_{Q1}$) to determine the next smallest key of the list. The procedure goes on by replacing each subsequently selected key by the next larger key from the same run, until all the runs are exhausted.

The second pass outputs can be merged in like manner by subsequent stages until a single sorted output list is obtained. In the subsequent passes the runs become longer and number of runs fewer.

Two-Pass Sorter

Figure 1:
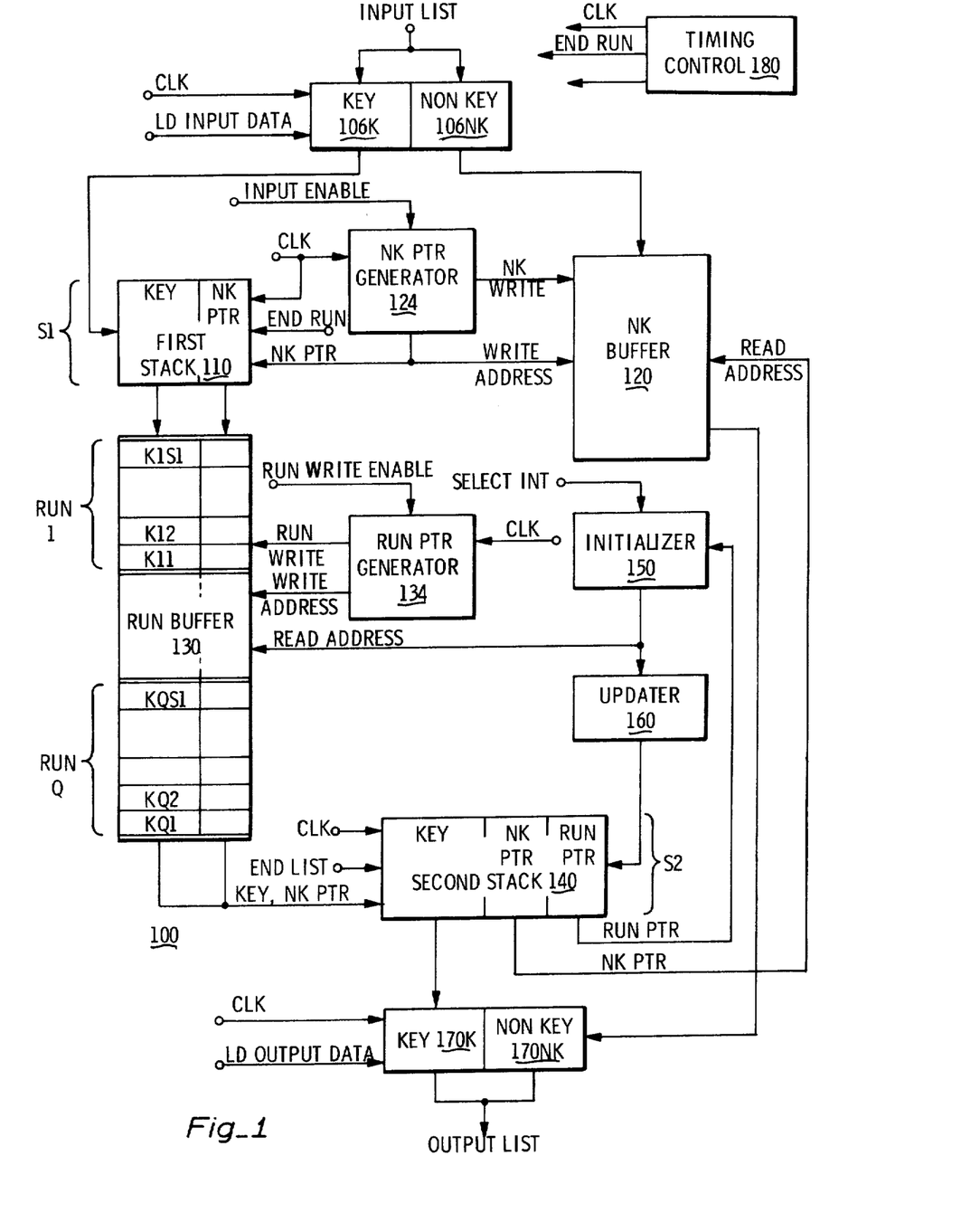
FIG. 1 is a block diagram of a two-pass sorter with a RAM buffer between stages.

FIG. 1 shows a block diagram for a two-pass sorter 100. During the first pass each word of the input list of N words is individually clocked through the key (K) and non-key (NK) sections of an input register 106 (K and NK). The key portions of the first S1 words of the input list are ascendingly sorted in a first-pass sort stack 110. The non-key portions are simultaneously clocked into an N position NK buffer 120 in order of arrival (list order). An NK buffer pointer generator 124 provides a non-key buffer pointer (NK PTR) for each NK portion as they enter NK buffer 120. Each NK PTR is inserted into stack 110 adjacent to the corresponding key portion to establish a retrieval link between the keys and non-keys. After the first run of S1 keys has been inserted into stack 110 in numerical order, the S1 keys are clocked into a run buffer 130 which is capable of holding S2 runs of S1 keys each — N keys. A run pointer (RUN PTR) generator 134 provides the address in run buffer 130 for writing the N sorted keys. As first stack 110 downshifts into run buffer 130 the upper positions become available to start sorting the next P keys. At the end of the first pass (N + S1 clocks) all the key portions of the N words in the input list are written in run buffer 130 and arranged in S2 sorted runs of S1 keys each. The NK portions of the input words are stored in order of arrival in NK buffer 120.

In the second pass, the keys of the S2 runs are merged into a second sort stack 140. Stack 140 is similar in function to stack 110. The words are inserted into stack 140 in ascending order of their keys. Each key is accompanied by its NK PTR and a run buffer pointer (RUN PTR) which is the address of the next element of the same run in run buffer 130.

The second sort pass is initialized by S2 clocks which load the smallest key of each run (the first key) into sort stack 140. An initializer 150 generates run buffer 130 addresses for the initial keys. During initialization, initializer 150 is incremented by S1, S2 times, i.e. the smallest key of the j-th run is in run buffer address j*S1, and the range of j is from 0 to S2−1. Run buffer pointers (RUN PTR) to accompany each key (pointer to the next key of the same run) are generated by an updater 160 which adds one to the address, i.e. j*S1+1. The RUN PTR is loaded into sort stack 140 during the next clock cycle, along with the j*S1+1 key and the j*S1+1 NK PTR from run buffer 130. After initialization, the smallest key of the S2 runs is at the bottom of second stack 140 while the smallest key (the replacement key) of the rest of the runs is either just above the smallest key or in the bottom position of the run from which came the smallest key. The smallest key is clocked out through output register 170K. The NK PTR accesses the non-key portion of the smallest key from NK buffer 120 which is clocked out through output register 170 NK. The RB PTR of the output key is updated by the addition of one in updater 160 to address the replacement key (the next smallest key in the run of the output key). This process continues recursively until all runs are exhausted. A timing control 180 provides the CLOCK and other control signals for initiating and coordinating the operation of two-pass sorter 100.

In order to minimize hardware and time requirements of the FIG. 1 two-pass sorter 100, the number of groups (S2) should be a number close in size to the number of keys (S1) in each group. Preferably in the two-pass case, S1 = S2 = 16. Further, first stack 110 may process the first pass of the next list while second stack 140 processes the second pass of the previous list in overlap fashion.

The Sort Stack

Sorting stacks 110 and 140 use a random insert, push-down circuit where the input key can be inserted in any location. The key already in the stack at the new key location and the keys in the locations prior thereto (containing smaller keys) are pushed down.

The keys already in the stack are assumed to be in sorted order on the top of the stack. The key to be inserted is simultaneously compared with all the other keys in the stack. The new key is inserted below larger keys and on top of smaller or equal keys, which are pushed down. When the stack is filled, all the keys therein are in sorted order. The stack is unloaded through a clocked push-down operation, smallest key first.

Figure 2:
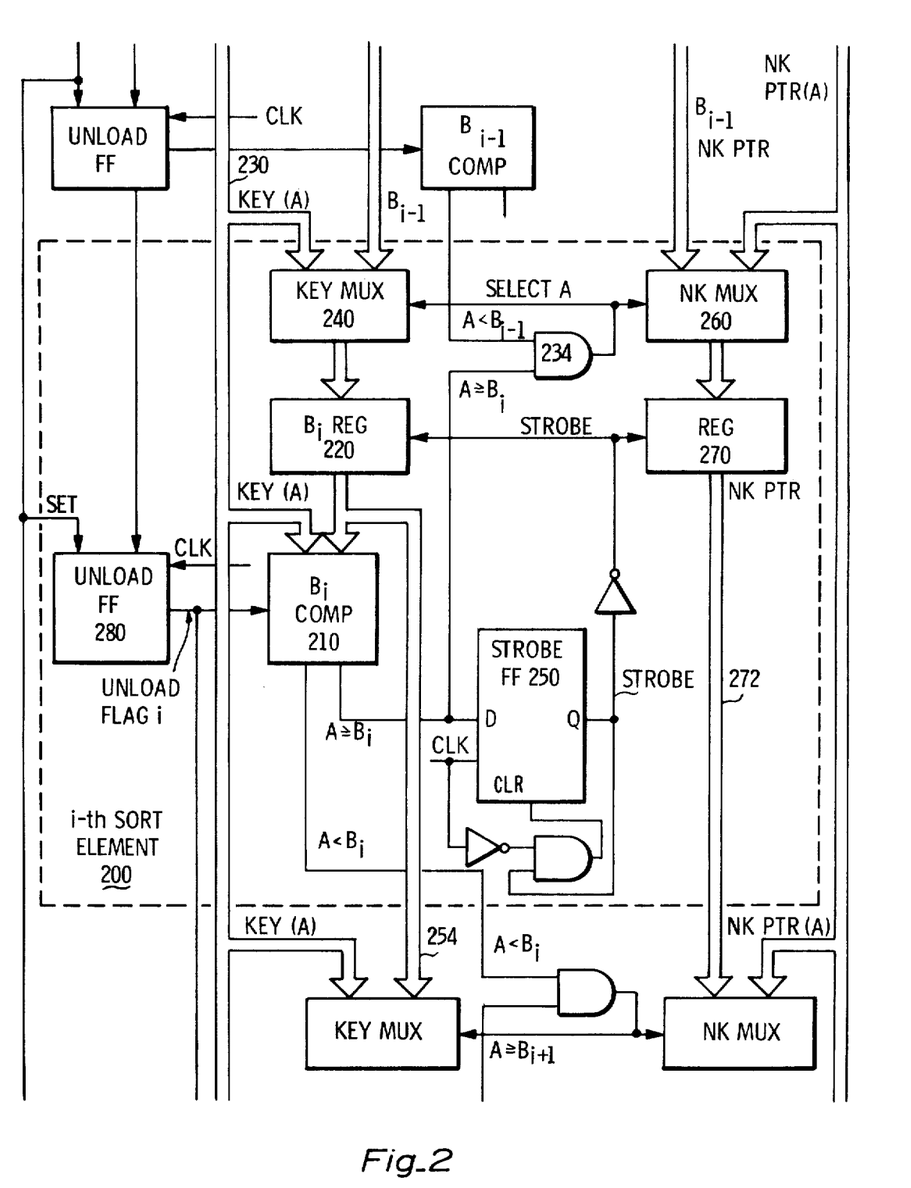
FIG. 2 is a detailed logic circuit of a portion of the first or second sort stack of a FIG. 1 showing the i-th sort element and portions of the preceding sort element $i-1$ and the subsequent sort element $i+1$.
Figure 3A:
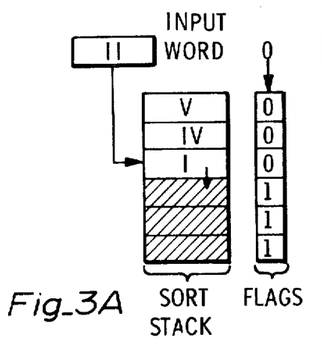
Figure 3B:
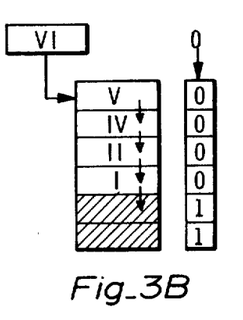
Figure 3C:
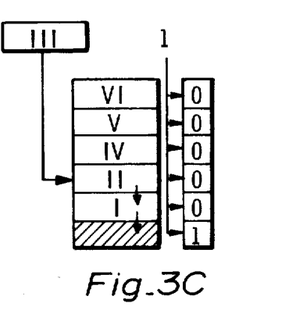
Figure 3D:
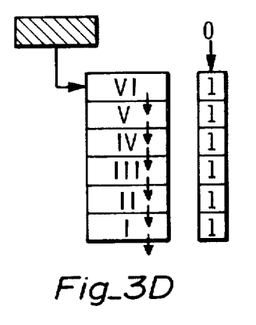
Figure 3E:
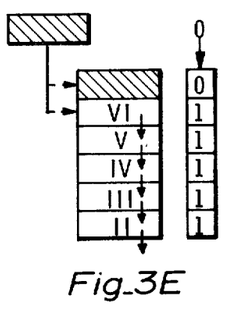
Figure 3F:
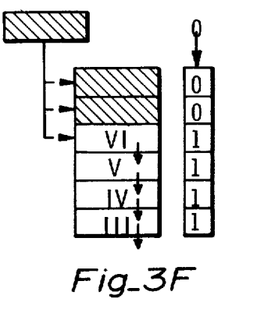

FIG. 2 shows a detailed logic diagram of the i-th sort element 200 of first sorting stack 110 or second sorting stack 140. A comparator 210 compares the contents of register 220 (sorted key, Bi) with the data on bus 230 (input key, A). Input key A is simultaneously compared to sorted keys in each element of the sort stack. If A is less than Bi the contents of register 220 remain unchanged, and an "A < Bi" signal is advanced to the i+1 sort element. If A is greater than or equal to Bi (and less than Bi−1) select gate 234 provides the logic signal "SELECT A" to key multiplexer 240. Input key A is loaded into register 220 at the next clock pulse in response to a STROBE bar pulse from strobe flip flop 250. The previous sorted key Bi contents of register 220 are advanced to the next sort element i+1 on key output bus 254. The pointer associated with each A and B key is received by pointer multiplexer 260 in accordance with the output of select gate 234, and is either held in pointer register 270 or advanced to sort element i+1 on pointer output bus 272 in response to STROBE bar pulse from strobe flip flop 250. Unload flip flop (unload FF) 280 advances sorted keys stored from the previous sort. A "1" UNLOAD FLAG from unload FF 280 will force comparator 210 output to be A < Bi. Input key A appears larger than sorted key Bi in register 220. A 0 output from unload FF 280 causes a normal comparison of sorted key B with input key A. Each sort element has an unload FF. The unload FF's are organized like a shift register. Each time a new key is inserted into the stack, another "0" is loaded into the top unload FF causing the entire flip flop contents to shift down one location. When all the unload FF are 0, the sorting is completed for that run, and a "SET" signal returns all the unload FF to 1 which permits them to be unloaded.

UNLOAD FLAGS

FIG. 3A-F illustrates this insertion and push-down technique in more detail by describing the operation of a six location sort stack example. Keys IV, I, V, II, VI and III are sorted in ascending order.

FIG. A. Three sorted words, I, IV and V, are already in the stack. Their flags are O. The input key II is presented to the top four locations and is inserted in the third location. The key I already in location 3 is pushed down to location 4. The O FF outputs are shifted down one location to occupy the first four locations.

FIG. B. The next key, VI, is presented to the top five locations. The flag in location 5 becomes zero.

FIG. C. The last key, III, to be sorted is presented to the six locations. All the unload FF are simultaneously set to 1 UNLOAD FLAG to prepare the stack for unloading.

FIG. D. All the keys are sorted in the stack and ready to be unloaded. All the FF outputs are 1. The first key of the next sort is ready to be inserted on top of the stack.

FIG. E & F. The sorted keys are unloaded through a pushdown operation while the keys of the next sort are being sorted into the vacated locations on top of the stack. The UNLOAD FLAGS on top of the stack become O as new keys are inserted.

EMPTY FLAGS

Figure 4:
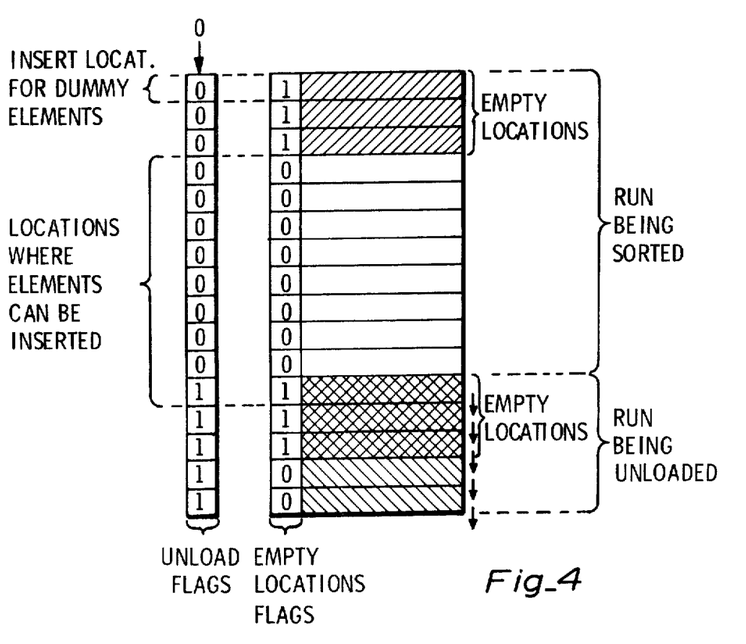
FIG. 4 shows the operation of the EMPTY FLAG which identifies empty locations in the interstage RAM buffer.

FIG. 4 illustrates the operations of EMPTY FLAG (EF) which are used in addition to the UNLOAD FLAGS to identify empty locations within the sort stack. Empty locations are created whenever a key is unloaded and no replacement key is present at the input of the stack. The capacity of the stack is of fixed length. All empty locations are flagged with EF = 1. The UNLOAD FLAG is used to differentiate between the keys of the run presently being sorted and the keys of the previous run which are presently being unloaded. Within each run, the EMPTY FLAG differentiates between keys and empty locations. Empty locations are flagged with EF=1 and are inserted on top of the stack. The keys A to be sorted are inserted only in the locations where both unload flags and empty flags are zero, except whenever the new key A is smaller than all sorted keys B of the run already in the stack. In this case key A is inserted in the next location down, which does not have 1 output (UNLOAD FLAG). The condition for an exhausted run of all empty locations can be detected by several means. If S1 is a power of two, e.g. $S1 = 2^b$, then the run is empty when the b least significant bits of RUN PTR are zero. Alternatively, when a run has less than S1 elements, the EF is set in the first sort pass and stored in the run buffer. When either of these conditions is detected, the EF at the input of the second stage stack is set to a logical one. This has the effect of a dummy word being inserted at the top of the stack and all the other words being pushed down Initializer 150 and Updater 160.

Figure 5:
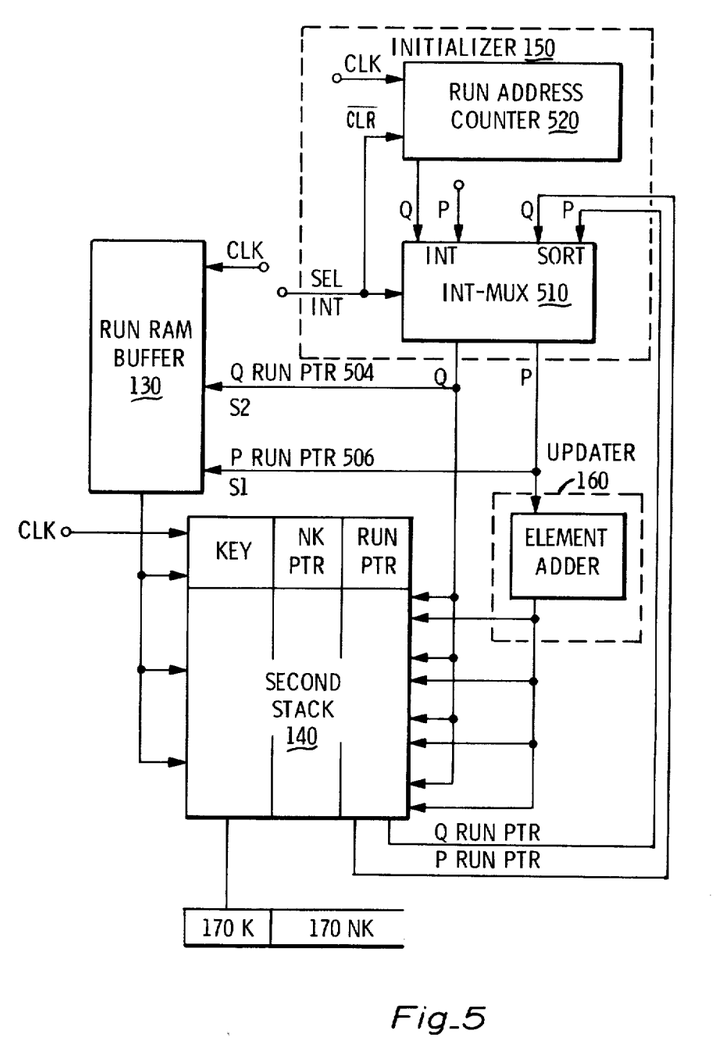
FIG. 5 shows a detailed logic circuit of the FIG. 1 initializer and updating circuitry operating between the second stack and the interstage RAM.

FIG. 5 shows a detail logic diagram of initializer 150 and updater 160. The RUN PTR is shown in two channels, a run channel 504 for the S2 address and an element channel 506 for the S1 address. During initialization, initializer multiplexer (Int-MUX) 510 selects run address counter 520 which supplies the S2 addresses for initialization. Run address counter 520 counts from 0 to S2−1 in the run channel. The element channel is a hard-wired O during initialization. The first location of each run in run buffer 130 is thereby addressed causing the smallest key of each of the S2 runs to enter into second stack 140. While run buffer 130 is addressed, the addresses are updated by updater 160 and entered into second stack 140 between the current key and NK PTR output of run buffer 130. After the Q CLOCK initialization, Int-MUX 510 selects RUN PTR's from second stack 140. Second stack 140 begins to sort and output the smallest keys through register 170. As each key is sorted its updated RUN PTR is processed through Int-MUX 510 to run buffer 130 to address the replacement key (the next smallest number in the same run as the output key). The sorting of second stack 140 continues until all of the runs are exhausted − N CLOCKs.

TIMING

Figure 6:
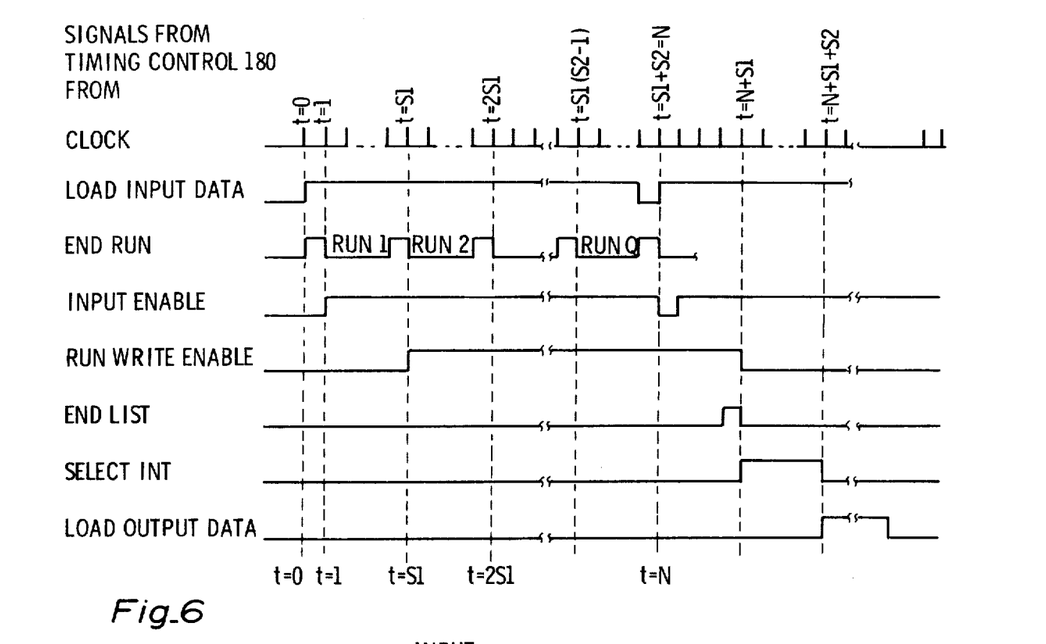
FIG. 6 is a timing diagram of the control signals from the FIG. 1 timing control circuit.

FIG. 6 shows the control signals from timing control 180 which synchronize the operation of sorter 100. From $t=0$ to $t=N-1$ LOAD INPUT DATA is applied to input register 106 for loading the input list of N items. Also at $t=0$ an END RUN pulse is applied to first stack 110 establishing UNLOAD FLAGS which cause sort elements 200 to start the shift down of the previous run (if any) creating room for the present run. END RUN is reapplied at S1 clock intervals to initiate unloading of each run after sorting. From $t=1$ to $t=N$ INPUT ENABLE is applied to NK PTR generator 124 which enables NKB to write and provides the write addresses (NK PTR) to NK buffer 120 and first stack 110. From $t=S1$ to $t+N+S1$ (N clocks), RUN WRITE ENABLE is applied to RUN PTR generator 134 which enables RUN buffer 130 to write and provides the write addresses. At $t=N+S1$ an END LIST pulse is applied to second stack 140 establishing UNLOAD FLAGS to initiate unloading of the previous list (if any) creating room in stack 140 for the present list. END LIST is reapplied at intervals of N clocks. From $t=N+S1$ to $t=N+S1+S2$ (S2 clocks) SELECT INT is applied to initializer 150 for inserting the smallest key from each of the S2 runs into stack 140. SELECT INT is reapplied at intervals of N clocks for a duration of S2 clocks. From $t=N+S1+S2$ to $t=2N+S1+S2$ (N clocks) *LOAD OUTPUT DATA* is applied to output register 170.

Single Sort Stack — No Overlap

Figure 7:
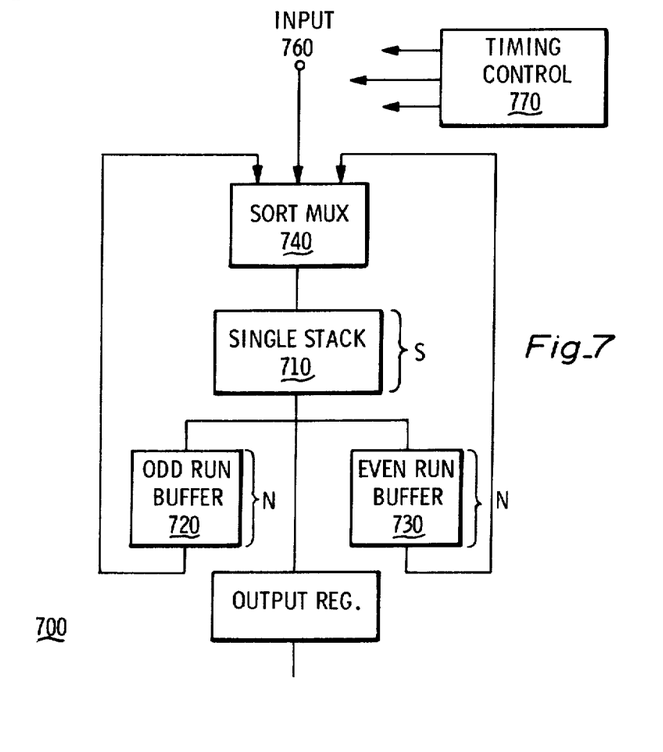
FIG. 7 is a block diagram of a multipass single stack sorter with buffer storage between passes.

FIG. 7 shows a multipass sorter 700 with a single sort stack 710 which is used in each pass. Simultaneous processing of more than one run (overlap operation) is not possible with single stack sorter 700. After each sort, the runs are stored in either odd run buffer 720 or even run buffer 730 until the next sort. Sort multiplexer 740 selects either input 760, odd run buffer 720, or even run buffer 730 in the proper sequence as determined by timing control 770. The END OF LIST pulse from timing control 770 could be programmed to issue after a fixed number of initial groups Q of S items each have been received from the input list, or after the input list has been exhausted (forming variable Q). The fixed group stack is required to cycle through a fixed number of passes M to process each input list. The variable Q stack makes only as many passes as required to merge the initial groups into a single output group.

Design Considerations

Multipass sorters may be designed to sort various length lists with different hardware and time requirements. Some of the primary design considerations are:

| | | |
|---|---|---|
| Nmax | = | the greatest number of input items that the sorter can handle (the size of the input list) |
| t | = | the time required to sort Nmax |
| M | = | the number of passes required to sort Nmax |
| Q1, Q2–QM | = | the number of groups Q in each of the M passes |
| P1, P2–PM | = | the group size P in each of the M passes (the number of items) |
| S1, S2–SM | = | the stack size S (number of locations) in each of the M stages in the overlap embodiment. In the single stack embodiment (FIG. 7) a single stage is used over and over M times, and therefore S is the same for each pass. |
| HwS | = | the hardware requirements for stack locations (the total number of sort elements 200 in all the stacks of all the stages) |
| HwMm | = | the hardware requirement in buffer memory locations |

In a multistack overlap sorter, the above design considerations have the following relationship:

| | | |
|---|---|---|
| Nmax | = | S1*S2*–*Sm =S product |
| HwS | = | S1+S2+–+Sm =S sum |
| t | = | Nmax + (initialization time) |
| | = | Nmax + (S1+S2+–Sm) |
| | = | S product + S sum |
| HwMm | = | M*Nmax |

The following table shows two examples of overlap sorters with Nmax = 256 illustrating the tradeoffs between HwS, t, and HwMm as M is varied. In general, increasing M reduces HwS and t but increases HwMm.

| | Multistack-Overlap | |
|---|---|---|
| | M = 2 | M = 4 |
| Nmax | 256 | 256 |
| S sizes | S1 = S2 = 16 | S1 = S2 = S3 = S4 = 4 |
| HwS | S sum = 32 | S sum = 16 |
| t | 256 + 32 = 288 | 256 + 16 = 272 |
| HwMm | 2*256 = 512 | 4*256 = 1024 |

Similarly, in a single stack-nonoverlap sorter, the above design concentrations have the following relationship:

| | | |
|---|---|---|
| Nmax | = | S product = $S^M$ |
| HwS | = | S |
| t | = | M (Nmax + initialization time) |
| | = | M (Nmax + S) |
| HwMm | = | 2*Nmax |

Similarly, in a single stack-nonoverlap sorter, the above design considerations have the following relationship:

| | | |
|---|---|---|
| Nmax | = | S product = $S^M$ |
| HwS | = | S |
| t | = | M (Nmax + initialization time) |

| | | |
|---|---|---|
| HwMm | = | M (Nmax + S) / 2*Nmax |

The following table shows the previous two examples (M=2 and M=4, for Nmax=256) for a single stack sorter illustrating that increasing M reduces HwS, but increases t, and HwMm remains constant.

| | Single Stack-Nonoverlap | |
|---|---|---|
| | M = 2 | M = 4 |
| Nmax | 256 | 256 |
| S | 16 | 4 |
| HwS | S sum = 16 | S sum = 4 |
| t | 512 + 32 = 544 | 1024 + 16 = 1040 |
| HwMm | 2*256 = 512 | 2*256 = 512 |

Concurrent Access of Twin Buffers

Figure 8:
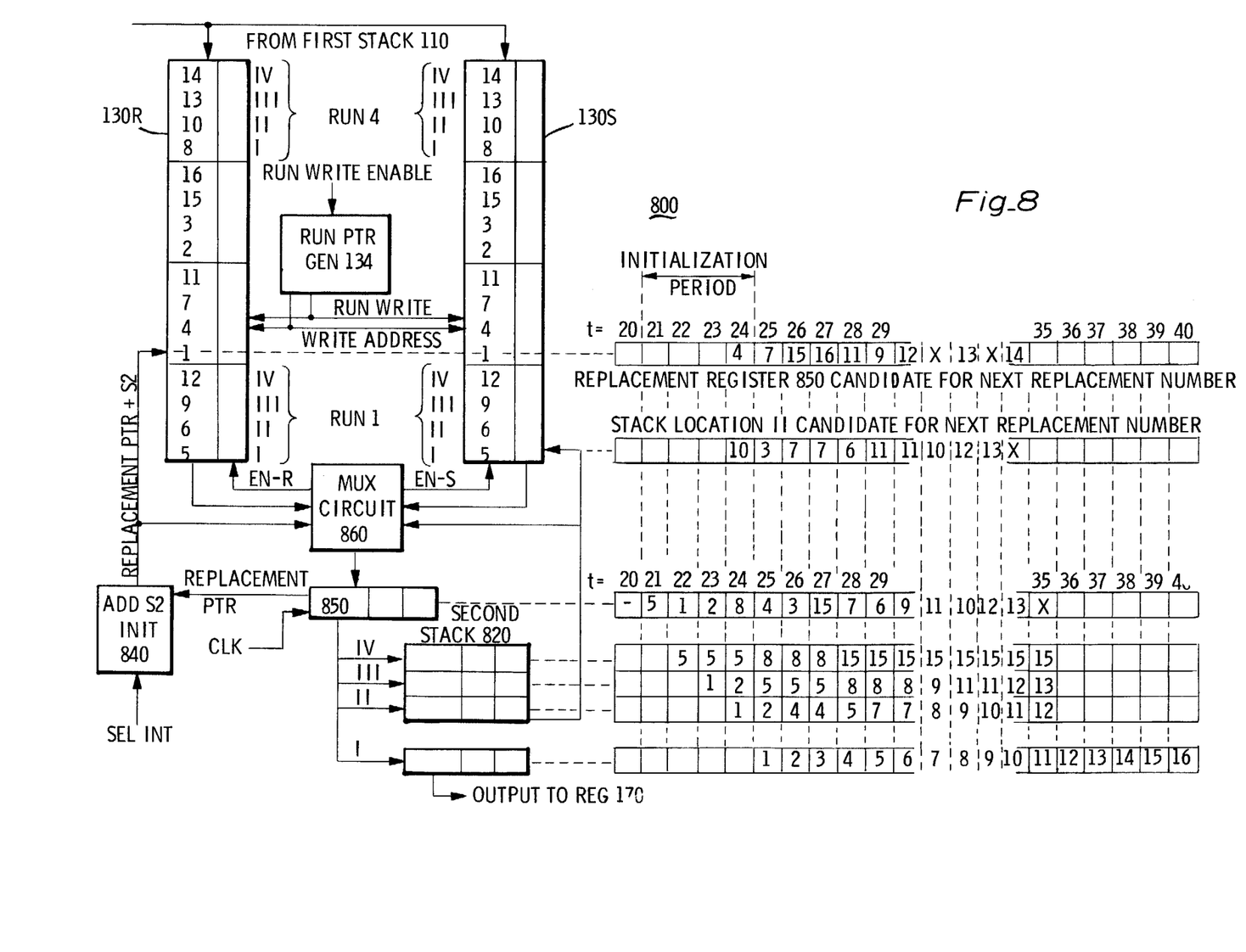
FIG. 8 is a block diagram of two-stage sorter with twin interstage buffers which are addressed concurrently to identify both replacement number candidates in advance.

FIG. 8 shows the second stage of a concurrent access sorter 800 which cooperates with a first sort stage similar to sorter 100 of FIG. 1. In the second stage of sorter 800, twin buffers 130R and 130S store the output of first stack 110. In the example shown in FIG. 8 the runs are depicted as having four numbers each (S1 = S2 = 4, N = 16). This is for convenience of explanation and illustration. Sorter 800 is actually designed to cooperate with first sort stack 110 on an S1 = S2 = 16, N = 256 basis. Each buffer 130 contains identical data. The run is double-stored so that the two candidates for the replacement number of the next clock period may be addressed during the current clock period. The addressing of buffers 130R and S is done simultaneously with the sort in second stack 820 in the current period. The buffer addressing is done in parallel time with the second sort and not in series time as in the FIG. 1 sorter 100. This elimination of a separate address time permits a shorter clock period and faster data sort rate.

In the FIG. 8 example, numbers 1–16 of an arbitrarily ordered input list are identically stored in buffers 130R and S after completion of the first sort ($t = N+S1 = 16+4 = 20$). Clock periods $t = 0$ to $t = 20$ are required to process the sixteen input numbers through the first sort into buffers 130R and S. At $t = 20$ the last number (number 14) from the run is written into buffers 130R and S at location IV of run 4. Also at $t = 20$, buffers 130 are switched to read mode by the absence of RUN WRITE ENABLE into run pointer generator 134, and initializer 840 is activated by SEL INT. At $t = 21$ initialization of second stack 820 begins and the contents of buffer 130R at run 1, location I (the number 5), are read into replacement register 850 through multiplexer 860. The data-time table extending to the right of sorter 800 in FIG. 8 illustrates how the run numbers in buffers 130 are processed through second sort 140. At $t = 22$ the number 5 in replacement register 850 is sorted into location IV of stack 820. The run pointer associated with the number 5 is simultaneously processed through initializer 840 where S1 = 4 is added for addressing buffer 130R at run 2, location I, which in the FIG. 5 example contains the number 1. During $t = 22$ the number 1 is processed through multiplexer 860 into replacement register 850. At $t = 23$ the number 1 is sorted into second stack 140 to occupy location III and the number 1 run pointer is increased by S1 = 4 for addressing buffer 130R run 3 at location I (which contains the number 2). The number 2 appears in replacement register 850. At $t = 24$ the number 2 is sorted into location III of stack 820 pushing the number 1 down to location II, and the number 2 pointer increases by $S1 = 4$ through initializer 850 and addresses buffer 130R at run 4, location I (which contains the number 8). The number 8 appears in replacement register 850. The stack 820, location II, pointer (LOCATION II PTR) for the number 1 addresses buffer 130S. The initialization of second stack 820 requires $S2 = 4$ clock periods and is complete at $t=24$. Output register 870 is activated by LOAD OUTPUT DATA in anticipation of sorted numbers appearing in stack 820 at location I.

At $t = 25$ the sorting in second stack 820 begins, and the smallest number in the list is entered in location I of stack 820. This smallest number will come from either location II of stack 820 or replacement register 850. Pointers from both candidates for the smallest number have already accessed buffers 130R and S to identify both candidates for the next replacement number. During $t = 24$ LOCATION II PTR accesses buffer 130S identifying the next smallest number in the same run as the current occupant of stack 820, location II. That is, the run pointer for number 1 in stack 820, location II, addresses buffer 130S at run 2, location II, identifying the number 4 as the next replacement number for replacement register 850 if number 1 from stack location II is chosen as the smallest number during $t = 25$. Also, during $t = 24$ REPLACEMENT PTR from replacement register 850 accessed buffer 130R identifying the next smallest number in the same run as the current occupant of replacement register 850. That is, the run pointer for 8 in replacement register 850 addresses buffer 130R at run 4, location II, identifying 10 as the next replacement number if the current replacement number 8 is chosen as the smallest number over the current stack location II number 1.

At $t = 25$, number 1 in stack location II advances to stack location I as the smallest number, and the last initial number, number 8 in replacement register 850, is sorted into stack location IV pushing the contents of location IV and III (5 and 2) down by one location. Because 1 in stack location II was chosen, the next replacement number comes from stack buffer 130S, and 4 is entered into replacement register 850. The pointer from new replacement number 4 immediately addresses buffer 130R to identify the number 7 as one candidate for the next replacement number. Simultaneously, the new occupant of stack location II, the number 2 addresses stack buffer 130S identifying 3 as the other candidate for the next replacement number. EACH TIME THE SMALLEST REMAINING NUMBER IS ADVANCED TO STACK LOCATION I, ITS CANDIDATE FOR THE REPLACEMENT NUMBER IS ENTERED INTO REPLACEMENT REGISTER 850, AND THE POINTERS FROM REPLACEMENT REGISTER 850 AND STACK LOCATION II ADDRESS BUFFERS 130R AND S TO IDENTIFY THE TWO CANDIDATES FOR THE NEXT REPLACEMENT NUMBER.

Figure 9:
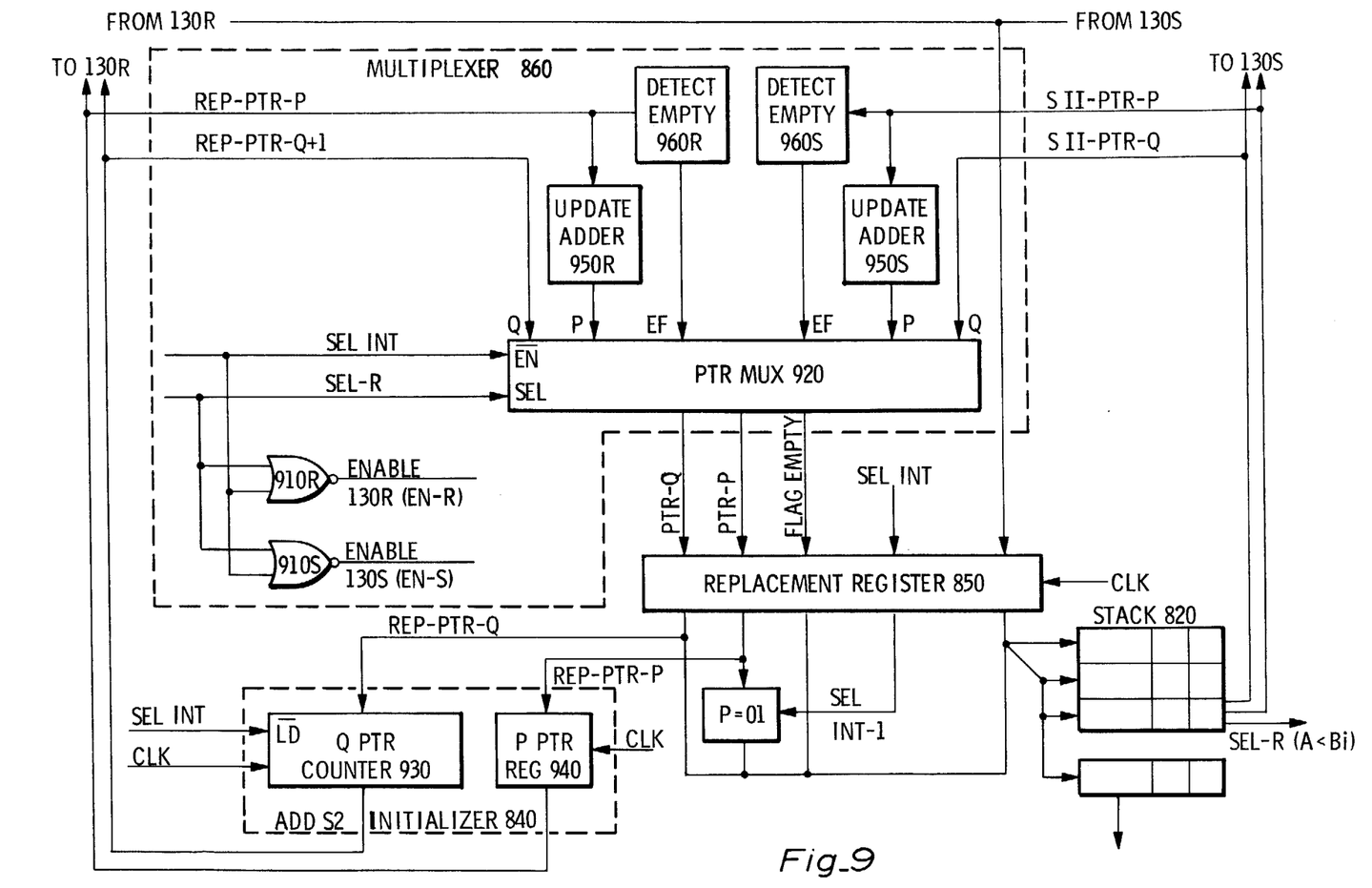
FIG. 9 is a detailed logic circuit of initializer 840, the replacement register 850, and the multiplexer 860 of FIG. 8.

FIG. 9 shows a detailed logic diagram of initializer 840, replacement register 850, and multiplexer 860. Replacement pointer (REP-PTR) and Stack II pointer (SII-PTR) correspond to the run buffer pointer (RUN PTR) of FIG. 5, and each has a Q portion and a P portion. The Q portion identifies one of the S2 groups and the P portion identifies one of the S1 locations within the group. During the initialization period SEL INT enables replacement buffer 130R through gate 910R, and disables pointer multiplexer 920 causing REP-PTR-Q and REP-PTR-P to appear at initializer 840. Initializer 840 has a Q pointer counter 930 which adds one to the REP-PTR-Q each clock, and a P pointer register 940 for holding REP-PTR-P. Increasing REP-PTR-Q by one is the same as adding S1 to the replacement pointer (REP-PTR). The output of initializer 840 (REP-PTR-Q+1, and REP-PTR-P) is forwarded to enabled replacement buffer 130R to sequentially address the first location of each run, and is also recycled through pointer multiplexer 920 to be recounted by initializer 840. During initilization REP-PTR-Q increases from zero to three to address runs 1 through 4, while REP-PTR-P remains at zero for addressing the first location of each run. After S2 clocks, S2 keys have been read from enabled replacement buffer 130R into replacement register 850 and stack 140. A SEL-R signal is provided from element II in second stack 140. The SEL-R signal causes pointer multiplexer 920 to select either REP-PTR (Q and P) or SII-PTR (Q and P). The SEL-R signal also enables either replacement buffer 130R or stack buffer 130S through gates 910R and S to receive either of the two previously addressed candidates for the replacement number in register 850. The SEL-R signal is the A < Bi signal described in FIG. 5. Update adders 950R and S add +1 to each REP-PTR-P and SII-PTR-P as they pass through multiplexer 860 en route to replacement register 850. The +1 update causes each pointer to access the adjacent location when the pointer is forwarded to buffers 130R and S as REP-PTR-P or SII-PTR-Q. Detect Empty circuits 960R and S provide EMPTY FLAGS as described in FIG. 4. SEL INT−1 is provided one clock after SEL INT by a one-clock delay through replacement register 850 for maintaining the LSB of REP-PTR-P at 1 causing each stack PTR-P to address the next location within the associated run.

Double-Length Sorter

Figure 10:
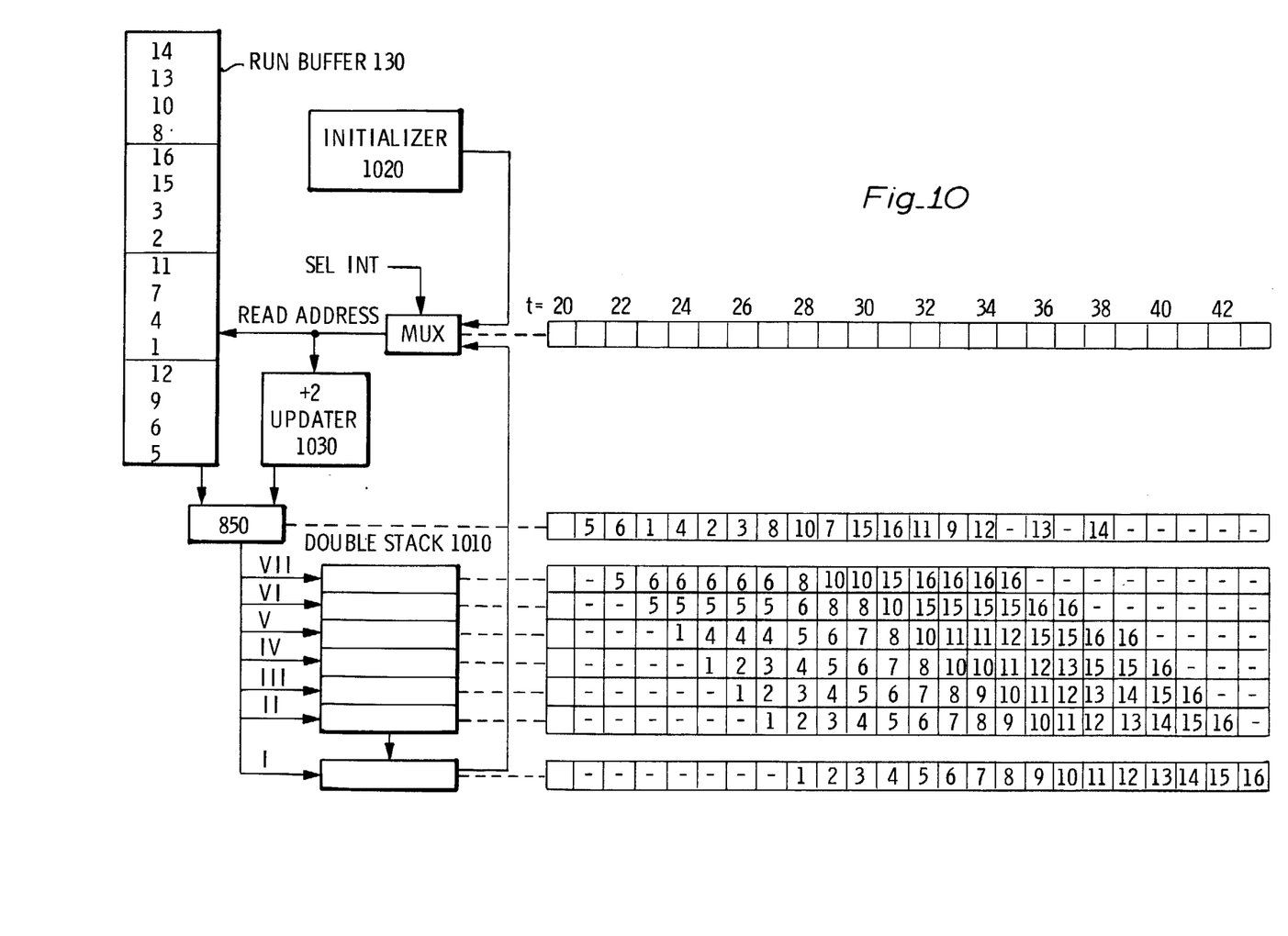
FIG. 10 is a block diagram of a two-stage sorter with a double-length, second stack for initially holding the two smallest numbers from each group.

FIG. 10 shows a double-length sorter embodiment 1000 of the present invention which identifies candidates in advance for the second and third smallest number using a technique slightly different from the twin buffer with concurrent access embodiment 800 of FIG. 8. A double-length sorter 1010 is initialized by initializer 1020 from $t = 21$ to $t = 29$ through replacement register 850. The first two numbers from each group of run buffer 130 are involved in initialization — seven into stack 1010 locations I–VII and one into replacement register 850. As each smallest remaining number occupies stack 1010 location I, the associated pointer is updated two locations by updater 1030 and forwarded to the proper group of run buffer 130 to identify the next replacement number for replacement register 850. The two candidates for the next smallest remaining number are the number in double stack 1010 location II and the replacement number in register 850. These second smallest number candidates are always available at least one clock period prior to the second smallest number selection. The only candidate existing for the next replacement number is the number in run buffer 130 which is addressed by the updated pointer from the smallest remaining number in stack 1010 location I. Each next replacement number is accessed within run buffer 130 as the current replacement number is sorted from replacement register 850 into double stack 1010.

Initializer 1020 may initialize double stack 1010 in several ways. Initializer 101 may simply count 1-2, 1-2, etc. and enter the first two numbers of each group into double stack 1010 as shown in the data-time table in FIG. 10. Alternatively, initializer 1020 may count 1-1-1-1, 2-2-2-2, to enter the first numbers of each group of run buffer 130 into double stack 1010, and then enter the second numbers from each group.

Detailed Description of Best Mode

The following paragraphs describe the structure and operation of each block in FIGS. 1, 2 and 5 in detail at the logic element level. Where appropriate, Texas Instrument integrated circuit numbers are provided from:

"The TTL Data Book for Design Engineers," First Edition — Copyright 1973, Texas Instruments Incorporated.

Input register 106 is a series of six-bit registers (74S174) connected in parallel to receive key and non-key input data. The CLOCK and LOAD INPUT DATA are combined through a NAND gate (74S00) to supply the load input to six-bit register within register 106.

Stack 110 is a series of sort elements 200 sequentially arranged. The key input and NK PTR are inserted into the series in key numerical order.

NK buffer memory 120 (and 130) has one read write memory (SN 74S200) for each input bit. The memory (SN 74S200) has 256 locations which limits this best mode embodiment to an input list of 256 items (N=256). A larger buffer memory may be employed for larger N application.

NK PTR generator 124 is two synchronous 4-bit counters (SN 74161) in cascade for counting from 0–255 (the NK PTR for the 256 input items). The CLOCK and INPUT ENABLE are combined through a NAND gate (74S00) to provide NK WRITE to NK buffer 120 and to advance the counter. The counter is cleared by input ENABLE bar.

RUN PTR generator 134 is structurally identical to generator 124.

Stack 140 is identical in structure and operation to stack 110 except that the input key (A) is formed by concatenating the key and the Q RUN PTR (see Bi comparator 210).

Updater 160 is a four-bit adder (SN 74283) for incrementing the P RUN PTR by one to provide the address in run buffer 130 of the next key of the same run as the output key.

Output register 170 is structurally identical to input register 106.

Timing control 180 contains a crystal oscillator for determining the period of CLOCK.

Bi comparator 210 in first stack 110 is a two-level tree formed by five four-bit magnitude comparators (SN 74S85), four in the first level and one in the second level. The tree compares the input A key on input bus 230 to the sorted Bi key in Bi register 220. UNLOAD FLAG is applied to the MSB of the first level of comparator 210. The A=B case is handled by hardwiring the LSB of A key to 1 and the LSB of Bi key to 0. Whenever A=B, B has priority because it is hardwired to appear smaller than A.

Bi comparator 210 in second stack 140 is identical in structure and operation to the first stack comparators, except an extra four-bit comparator (SN 74S85) is required in the first comparison level to accommodate Q RUN PTR. The key A of first stack 110 is combined with Q RUN PTR from run address counter 520 to form the key A of second stack 140. Also, EMPTY FLAG is applied to the next MSB of the first level of comparator 210.

Bi register 220 and Bi key MUX 240 may be combined in a series of parallel arranged quadruple 2-input multiplexer with storage (SN 74298).

Strobe flip flop 250 is a D-type flip flop (SN 74S74). The inverted CLEAR required by this flip flop is provided by combining CLOCK bar with STROBE through a NAND gate (SN 74S00).

Flip flop 280 is one quarter of a 4-bit parallel access shift register (SN 74195) with all parallel inputs tied to logical signal 1.

Initializer multiplexer 510 is two 2-input multiplexers (74S157), one for Q RUN PTR and one for P RUN PTR.

Run address counter 520 is a 4-bit counter (74161) for counting from Q = 0 to Q = 15.

Replacement register 850 may be a series of 6-bit registers (SN 74S174) for holding the replacement key number, the NK PTR and the RUN PTR (REP-PTR).

Gates 910R and S may be an OR gate (74S32) and NOR gate (74S02) for providing complementary signals EN-R and EN-S.

Pointer multiplexer 920 may be a series of 2:1 multiplexer with select and enable (74S157) for selecting the appropriate pointers and keys.

Q pointer counter 930 may be a synchronous presettable counter with clear (74161) which receives and initializes the Q (or S2) portion of the REP-PTR by adding 1 thereto each clock period.

P pointer register 940 may be part of a six-bit register (74S174) for holding the 4 bits of the P (or S1) portion of REP-PTR.

Update adders 950 may be a pair of four-bit binary adders (74283) for increasing the P portion of the pointers by 1 each clock period.

Detect empty 960R and S may be a pair of 5-input NOR gates (74S260) for responding to the 4 bits of zeros in REP-PTR-P.

P = 01 circuit 970 may be an OR gate (74S32) for forcing the LSB of REP-PTR-P to 1.

Double stack 1010 may be the same as first stack 110 except stack 1010 has more locations.

Initializer 1020 may be similar to initializer 150 except that the P value counts from 0 to 1 and the Q value is incremented every two cycles.

Updater 1030 may be similar to updater 160 except that updater 1030 adds two.

CONCLUSION

The objects of the present invention have been accomplished by retrieving the replacement number from storage. The replacement number is then held in a register for immediate sorting into the second stack without memory access time as the current smallest number is clocked out. In one embodiment the replacement number is identified in advance by preaddressing the two candidates for the next replacement in twin storage devices. In another embodiment the replacement number is timely provided by delaying the time when the replacement number is required. This delay is established by initially entering the two smallest numbers from each group into the second stack. The replacement number now has an extra clock period to appear in the replacement register after first being addressed in memory. The second number from the same group as the replacement number and the current output number, is always in the second stack and must be clocked out before the replacement number can be sorted in. In this embodiment the second stack is always one number ahead of memory addressing.

It will be apparent to those skilled in the art that various changes may be made in the subject matter described without departing from the scope of the invention. For example, the concurrent access embodiment of FIG. 8 or the double stack embodiment of FIG. 10 may be employed to speed up the single stack embodiment of FIG. 7.

I claim as my invention:

1. An M stage sorter for arranging input members into a numerical order, comprising:
   means for grouping the input numbers into groups;
   a first stage for ordering the input numbers within each of the groups, and formed by:
   first stage input means for sequentially receiving all of the input numbers within each of the groups;
   first stage means for comparing each currently received input number to the previously received numbers from the same group; and
   first stage storage means for inserting each currently received input number into proper numerical order among the numbers previously received from the same group;
   M-1 subsequent sequential stages for progressively forming fewer groups of more numbers each, the last stage of which provides all of the input numbers in numerical order, each stage formed by:
   interstage storage means for storing the ordered groups from the preceding stage;
   stack input means for sequentially receiving each of the numbers stored in the interstage storage means;
   stack comparing means for comparing each currently received number to the previously received numbers currently in the sorting stack;
   stack pushdown storage means for inserting each currently received number into proper numerical order among the previously inserted numbers, which pushdown stormeans progressively fills up from a first-filled position to a last-filled position as each currently received number is inserted;
   interstage output means for advancing the current number in the last filled position to the next stage;
   replacement means for holding a replacement number from the interstage storage means for insertion into the stack pushdown storage means via the stack input means and stack comparing means as each current output number is advanced from the last filled position of the pushdown storage means to the interstage output means;
   candidate pointer means for providing a candidate pointer for a next replacement number candidate for each replacement number from the interstage storage means prior to entering the replacement means for identifying candidates for the next replacement number;
   first access means for permitting the candidate pointer for the current replacement number in the replacement means to access a first candidate for the next replacement number from the interstage storage means;
   second access means for permitting the candidate pointer for the current number in the last filled position of the pushdown storage means to access a second candidate for the next replacement number from the interstage storage means; and
   a candidate comparing means for selecting the next replacement number from the two candidates for entry into the replacement means as the current replacement number is inserted into the stack pushdown storage means; and
   output means for receiving the numbers in numerical order from the last of the M sequential stages.

2. The M stage sorter of claim 1, wherein the candidates for the next output number from each pushdown stack storage means are the current replacement number in the replacement means and the number in the next-to-last filled position of the stack pushdown storage means.

3. The M stage sorter of claim 2, wherein:
   the first candidate for the next replacement number is the next number from the same group in the interstage storage means as the current replacement number; and
   the second candidate for the next replacement number is the next number from the same group in the interstage storage means as the current number in the last filled position of the stack pushdown storage means.

4. The M stage sorter of claim 3, further comprising M-1 initialization means, one within each of the subsequent M-1 stages, for causing the first number from each group within the preceding interstage storage means to initially enter the stack input means for sorting into numerical order in the stack push-down storage means.

5. The M stage sorter of claim 4, wherein each interstage storage means has a first and a second storage device, each of which stores all of the input numbers as they pass between sequential stages.

6. The M stage sorter of claim 5, wherein the first storage device is responsive to the candidate pointer for the replacement number in the replacement means via the first access means for addressing within the first storage device the first candidate for the next replacement number, and the second storage device is responsive to the candidate pointer for the second number in the stack pushdown storage means via the second access means for addressing within the second storage means the second candidate for the next replacement number.

7. The M stage sorter of claim 6, wherein both candidates for the next replacement number are concurrently addressed within the first and second storage device via the first and second access means as the current number in the last position is advanced to the interstage output means, permitting the next replacement number to be selected and immediately entered into the replacement means.

8. The M stage sorter of claim 7, wherein the first and second storage devices between each sequential stage are a first and second storage buffer, each of which identically stores the input numbers as the pass between sequential stages.

9. The M stage sorter of claim 8, further comprising M-1 buffer pointer means, one for each subsequent stage for providing each number stored in the storage buffers with a unique pointer for addressing the storage buffers.

10. The M stage sorter of claim 9, wherein each buffer pointer means is a counter for establishing sequential buffer pointers.

11. The M stage sorter of claim 10, further comprising M-1 buffer switching means, one associated with each subsequent stage between the first and second storage buffers and the replacement means, for receiving both candidates for the next replacement number from the storage buffers, and responsive to the candidate comparing means for directing the selected one of the candidates for the next replacement number into the replacement means.

12. The M stage sorter of claim 11, wherein the buffer switching means is a 2:1 multiplexer.

13. The M stage sorter of claim 11, wherein:
the buffer pointer means provides a pointer for each number stored in the storage buffers; and
the candidate pointer means increments the buffer pointer for each number to address a candidate for the replacement number for each number.

14. The M stage sorter of claim 13, wherein the number of numbers in each group (P) is equal to the number of groups (Q).

15. The M stage sorter of claim 13, wherein the number of input numbers is 256, M=2, and P=Q=16.

* * * * *